United States Patent
Kunz et al.

(10) Patent No.: US 10,030,788 B2
(45) Date of Patent: Jul. 24, 2018

(54) HYDRAULIC VALVE WITH ADJUSTABLE LOCKING DEVICE

(71) Applicant: Robert Bosch GmbH, Stuttgart (DE)

(72) Inventors: Reiner Kunz, Sachsenheim (DE); Christoph Keyl, Stuttgart (DE); Steffen Knapper, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/650,435

(22) Filed: Jul. 14, 2017

(65) Prior Publication Data

US 2017/0314702 A1 Nov. 2, 2017

Related U.S. Application Data

(62) Division of application No. 15/171,097, filed on Jun. 2, 2016, now Pat. No. 9,797,523.

(30) Foreign Application Priority Data

Jun. 2, 2015 (DE) .................. 10 2015 210 129

(51) Int. Cl.
*F16K 35/06* (2006.01)
*F16K 35/02* (2006.01)
(Continued)

(52) U.S. Cl.
CPC .......... *F16K 35/022* (2013.01); *F16K 1/523* (2013.01); *F16K 31/1221* (2013.01); *F16K 35/06* (2013.01)

(58) Field of Classification Search
CPC .... F16K 35/022; F16K 31/1221; F16K 35/06; F16K 1/523
(Continued)

(56) References Cited

U.S. PATENT DOCUMENTS

| | | | | |
|---|---|---|---|---|
| 2,594,664 A | * | 4/1952 | Livers ................. | F16K 11/0704 137/624.27 |
| 4,309,022 A | * | 1/1982 | Reinicke ............. | F16K 31/1221 251/297 |
| 4,913,190 A | * | 4/1990 | Kugler ................ | F16K 11/0704 137/624.27 |

FOREIGN PATENT DOCUMENTS

| | | |
|---|---|---|
| DE | 39 23 743 A1 | 1/1991 |
| DE | 101 57 030 A1 | 5/2003 |

(Continued)

OTHER PUBLICATIONS

Rexroth Bosch Group, "Load-sensing control block in sandwich plate design SB23-M", RE 66130, Jan. 2014, 24 pages (available at https://www.boschrexroth.com/ics/cat/?id=&cat=Mobile-Hydraulics-Catalog&m=DE&u=si&o=Desktop &p=g261584,g261607,g261608,p662757&pi=0BCA640A-0CDE-C9FB-EC9100D80953A23E_ICS_82).
(Continued)

*Primary Examiner* — John Bastianelli
(74) *Attorney, Agent, or Firm* — Maginot, Moore & Beck LLP

(57) ABSTRACT

A hydraulic valve includes a sliding control member that delimits at least one constantly adjustable diaphragm. The sliding control member is configured to be moved in the direction of a longitudinal axis. The hydraulic valve further includes a locking device with a locking member that is configured to be moved counter to the force of a first spring transversely relative to the longitudinal axis. The hydraulic valve further includes at least one catch contour in which the locking member is configured to be engaged in such a positive-locking manner that the sliding control member is releasably retained in a catch position that is associated with the respective catch contour. The position of at least one catch contour is constantly adjustable in such a manner that (Continued)

the free cross-sectional surface-area of the at least one diaphragm is constantly adjustable in the associated catch position.

8 Claims, 3 Drawing Sheets

(51) Int. Cl.
*F16K 1/52* (2006.01)
*F16K 31/122* (2006.01)

(58) Field of Classification Search
USPC .................. 251/285, 297, 331, 335.2, 337
See application file for complete search history.

(56) References Cited

FOREIGN PATENT DOCUMENTS

DE     10 2011 109 505 A1     2/2013
EP     1 446 599 B1     4/2007

OTHER PUBLICATIONS

German Search Report corresponding to German Application No. 10 2015 210 129.0, dated Feb. 26, 2016 (9 pages) (German language document).

\* cited by examiner

HYDRAULIC VALVE WITH ADJUSTABLE LOCKING DEVICE

This application is a Divisional of co-pending U.S. application Ser. No. 15/171,097, filed on Jun. 2, 2016, which in turn claims priority under 35 U.S.C. § 119 to patent application no. DE 10 2015 210 129.0, filed on Jun. 2, 2015 in Germany, the disclosures of which are incorporated herein by reference in their entirety.

BACKGROUND

The disclosure relates to a hydraulic valve.

A hydraulic valve is known from DE 39 23 743 A1. The valve has a sliding control member which can be moved in the direction of a longitudinal axis and which delimits a constantly adjustable diaphragm. There is further provided a locking device which has a locking member which can be moved counter to the force of a first spring transversely relative to the longitudinal axis. There are further provided two catch contours in which the locking member can be engaged in such a positive-locking manner that the sliding control member is releasably retained in a catch position which is associated with the respective catch contour.

It is further known to steplessly adjust the volume flow in the catch positions by means of a separate, constantly adjustable diaphragm.

SUMMARY

An advantage of the valve proposed is that the volume flow in at least one catch position is constantly adjustable. The valve is further constructed in a particularly simple manner. In particular, it is possible to dispense with the separate, constantly adjustable diaphragm for adjusting the volume flow in the catch position. Furthermore, the valve is particularly space-saving.

In accordance with the disclosure, it is proposed that the position of at least one catch contour be constantly adjustable in such a manner that the free cross-sectional surface-area of the at least one diaphragm is constantly adjustable in the associated catch position. The sliding control member is thus in the catch position from the outset in a position in which the associated constantly adjustable diaphragm on the sliding control member has the free cross-sectional surface-area which is required in order to adjust the desired volume flow.

The hydraulic valve preferably has a housing having a pump connection location and at least one operating connection location and, if desired, a tank connection location, wherein the connection locations mentioned can be connected to each other in fluid terms in accordance with the position of the sliding control member via the at least one diaphragm. A fluid channel system is preferably provided in the housing for this purpose. The locking member and the first spring may optionally be received in the housing or in the sliding control member, wherein the catch contour is arranged on the other component, the sliding control member or housing, respectively. The locking member is preferably non-movable in the direction of the longitudinal axis with respect to the portion in which it is received.

Advantageous developments and improvements of the disclosure are set out in the dependent claims.

There may be provision for a first catch contour to be securely arranged on an outer peripheral face of the sliding control member, wherein it extends helically with respect to the longitudinal axis, wherein the rotation position of the sliding control member is constantly adjustable with respect to the longitudinal axis. Consequently, the free cross-sectional surface-area of the at least one diaphragm in the respective catch position can be constantly adjusted by rotating the sliding control member. The pitch of the helical line which is associated with the first catch contour may be constant or variable along the longitudinal axis.

There may be provided two first catch contours which are associated with different catch positions and which have an opposing pitch direction. The first two catch contours are preferably associated with two operating positions of the valve sliding member, in which positions the actuator which is connected to the valve has opposing movement directions. As a result of the proposed configuration of the catch contours, it is possible for the volume flow in the catch positions of the two operating positions to be adjusted in the same manner when the sliding control member is rotated.

There may be provision for a second catch contour to be securely arranged on the outer peripheral face of the sliding control member in such a manner that the first and the second catch contours define different catch positions, wherein the second catch contour extends in an annular manner with respect to the longitudinal axis. The second catch contour is preferably associated with a free-running position of the valve, in which the actuator which is connected to the valve can move freely.

There may be provided a separate first adjustment member which is secured in a rotationally adjustable manner on the outer side of a housing of the hydraulic valve, wherein the sliding control member is coupled in terms of movement to the first adjustment member with respect to a rotation. Consequently, the free cross-sectional surface-area of the at least one diaphragm in the respective catch position can be constantly adjusted by rotating the first adjustment member. The first catch member is readily accessible for the user of the valve. The corresponding rotation movement is transmitted by the proposed movement coupling to the sliding control member. The first adjustment member can preferably be rotationally adjusted with respect to the longitudinal axis. The sliding control member can preferably be displaced in the direction of the longitudinal axis with respect to the first adjustment member.

There may be provision for the first adjustment member to be constructed in a pot-like manner, wherein there is arranged within the first adjustment member a second spring which acts on the sliding control member in the direction of the longitudinal axis. Consequently, the first adjustment member further serves to protect the second spring from environmental influences.

There may be provision for the locking member and the first spring to be received in the sliding control member, wherein at least one catch contour is arranged on a separate second adjustment member which is secured to a housing of the hydraulic valve so as to be adjustable in a linear manner with respect to the longitudinal axis. Consequently, the free cross-sectional surface-area of the at least one diaphragm in the respective catch position can be constantly adjusted by displacing the second adjustment member in the longitudinal direction.

There may be provision for the at least one catch contour to be constructed in a rotationally symmetrical manner with respect to the longitudinal axis. Such a catch contour can be produced in a particularly simple manner by means of a rotational processing operation.

There may be provision for the second adjustment member to have a thread whose center axis coincides with the longitudinal axis, wherein the thread is in screwed engagement with a counter-thread on the housing. The linear adjustability of the second adjustment member can thereby be produced in a particularly simple manner. There may be provided a counter-nut which is in screwed engagement with the thread or with the counter-thread, wherein the second adjustment member can be clamped to the housing by means of the counter-nut.

There may be provision for a separate union nut to be provided which is in screwed engagement with the housing in such a manner that it can be moved in the direction of the longitudinal axis, wherein the union nut is coupled to the second adjustment member in terms of movement in the direction of the longitudinal axis. The union nut may be arranged on the housing in a particularly flexible manner so that it is readily accessible for the user.

Of course, the features mentioned above and those intended to be explained below can be used not only in the combination set out in each case, but also in other combinations or alone, without departing from the scope of the present disclosure.

BRIEF DESCRIPTION OF THE DRAWINGS

The disclosure is explained in greater detail below with reference to the appended drawings, in which.

DETAILED DESCRIPTION

Figure 1:
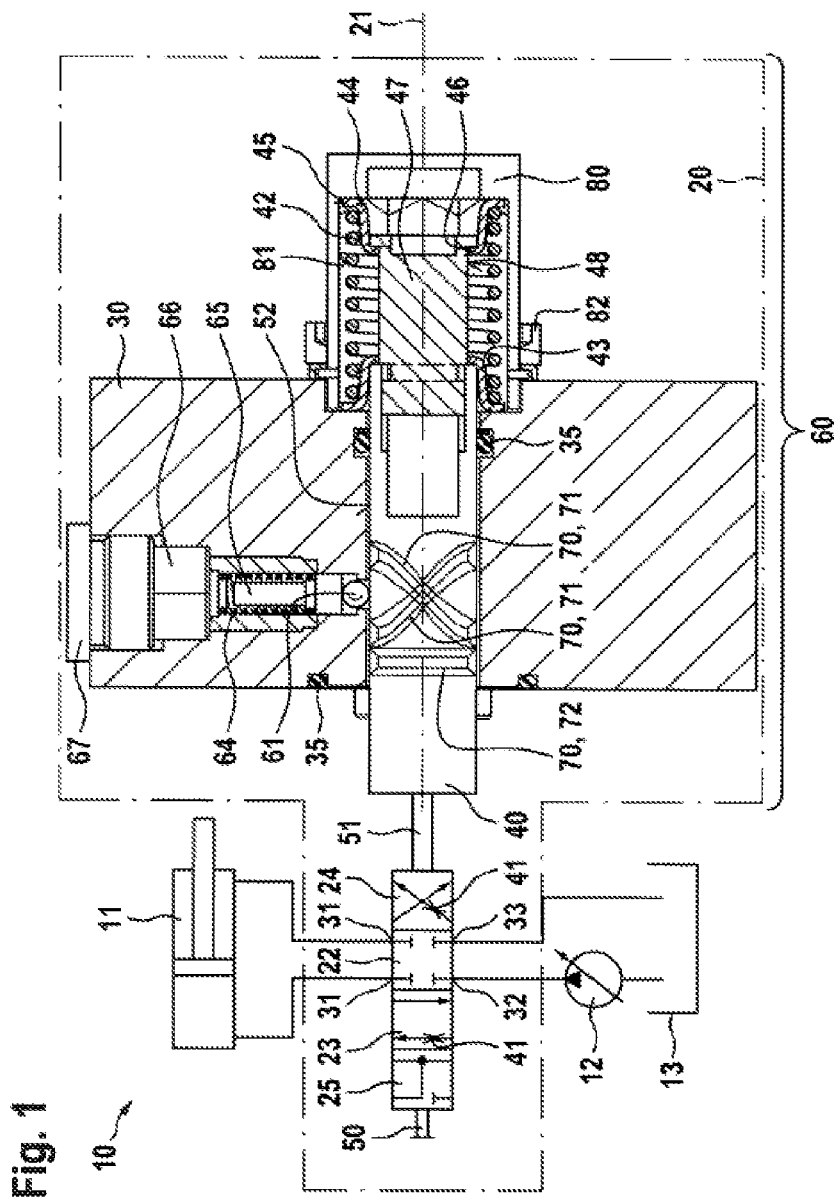
FIG. 1 shows a hydraulic drive system having a valve according to a first embodiment of the disclosure.

FIG. 1 shows a hydraulic drive system 10 having a valve 20 according to a first embodiment of the disclosure. The drive system 10 comprises an actuator 11 which is constructed, for example, as a hydraulic cylinder or a hydraulic motor, wherein it is connected to the two operating connection locations 31 of the valve 20. Furthermore, there is provided a pump 12 which is connected to the pump connection location 32 of the valve 20. Furthermore, there is provided a tank 13 which is connected to the tank connection location 33 of the valve 20.

The valve 20 comprises a locking device 60 which is illustrated in detail, wherein the remaining valve is indicated only schematically. The corresponding transition location is indicated with the reference numeral 51. The valve 20 has in this instance four switching positions and may, for example, be used in an agricultural tractor. In the locking position 22, all four connection locations 31; 32; 33 are locked so that the actuator 11 is hydraulically clamped in a non-movable manner. In the first operating position 23, the actuator 11 is deployed, with it being retracted in the second operating position 24. To this end, pressurized fluid is drawn from the pump 12 out of the tank 13 in each case and conveyed via the valve 20 to one side of the actuator 11, wherein pressurized fluid flows from the opposite side back to the tank 13. In the free-running position 25, the actuator 11 can be freely moved, wherein excess pressurized fluid flows to the tank 13 or lacking pressurized fluid is drawn from the tank 13. The free-running position 25 is, for example, required for the lifting mechanism of the tractor mentioned when the attachment which is fitted thereto is intended to rest on the ground with at least a portion of its inherent weight.

The sliding control member 40 of the valve 20 is retained by the second spring 42 in the non-actuated state in the locking position 22. With the actuation device 50 which is constructed in this instance as a manual actuation member, the sliding control member 40 can be moved into the remaining positions 23; 24; 25, wherein there is associated in this instance with each of these positions a catch position in which the sliding control member is retained counter to the restoring force of the second spring 42 by the locking device 60. As a result of a correspondingly large actuation force on the actuation device 50, the retention force of the locking device 60 can be overcome so that the sliding control member 40 can be moved further.

The valve 20 is constructed in this instance as a proportional valve, wherein it has a constantly adjustable diaphragm 41 which is arranged in the flow path which contains the pump connection location 32. The valve 20 according to the disclosure has the advantage that the free cross-sectional surface-area of this diaphragm 41 can be adjusted constantly at least in a portion of the catch positions.

The locking device 60 has a spherical locking member 61, which can be moved transversely relative to the longitudinal axis 21. The locking member 61 is in this instance pressed by a pretensioned first spring 64 in the direction of the sliding control member 40. The pressing force of the first spring 64 acts in this instance indirectly via a tappet 65 on the locking member 61 so that jamming is prevented. The partially circular-cylindrical tappet 65 is in this instance guided in a linearly movable manner in an adapted circular-cylindrical hole perpendicularly with respect to the longitudinal axis 21. At the side remote from the locking member 61, the first spring is supported on an abutment member 66 and a closure screw 67. The outer peripheral face of the abutment member 66 has, for example, a hexagonal cross-sectional shape which is received in an adapted recess perpendicularly relative to the longitudinal axis so as to be linearly movable and non-rotational. The closure screw 67 is screwed into the housing 30 of the valve 20, wherein the rotating screw movement cannot be transmitted to the first spring 64 as a result of the rotationally secure abutment member 66.

On the sliding control member 40 there are arranged a total of three catch contours 70 in which the locking member 61 can selectively engage in a positive-locking manner. The catch contours 70 are each constructed in the form of grooves with a constant, trapezoidal cross-sectional shape. The first two catch contours 71 extend in a helical manner with respect to the longitudinal axis so that, in the corresponding catch positions, the free cross-sectional surface-area of the diaphragm 41 can be adjusted by rotating the sliding control member 40. The first two catch contours 71 have an opposing pitch direction. The second catch contour 72 is associated with the free-running position 25 in which the diaphragm 41 is preferably closed, wherein an adjustment is not required. The second catch contour 72 is therefore constructed in an annular manner with respect to the longitudinal axis 21.

The second spring 42 is constructed between a first and a second spring plate 43; 44 with pretensioning. The first spring plate 43 is supported in the locking position 22 illustrated in FIG. 1 in the direction of the longitudinal axis 21 directly on the sliding control member 40, wherein the second spring plate 44 is supported in the opposite direction on a separate spacer screw 47. The spacer screw 47 is screwed into the sliding control member 40 and secured against release.

The first spring plate 43 is further supported on the housing 30. If the sliding control member 40 is moved to the left in FIG. 1, the first spring plate 43 is supported only on the housing 30. If the sliding control member 40 is moved in the opposite direction, the first spring plate 43 is supported only on the sliding control member 40. The second spring plate 44 is further supported on a first adjustment member 80 which surrounds the second spring 42 and the first and the second spring plate 43; 44 in a pot-like manner. The first adjustment member 80 is securely retained on the housing 30 in the direction of the longitudinal axis 21. If the sliding control member 40 is moved to the left in FIG. 1, the second plate spring 43 is supported only on the spacer screw 47, wherein the second spring 42 presses the sliding control member 40 to the right. If the sliding control member 40 is moved to the right in FIG. 1, the second spring plate 44 is supported only on the first adjustment member 80, wherein the second spring 42 presses the sliding control member 40 to the left.

The first adjustment member 80 is rotationally adjustable with respect to the longitudinal axis 21 with respect to the housing 30, wherein the rotation position thereof can be released or secured with the retention member 82. The sliding control member 40 is coupled in terms of movement to the first adjustment member 80 in terms of rotation about the longitudinal axis 21, wherein the portions mentioned can be moved relative to each other in the direction of the longitudinal axis 21. To this end, the inner peripheral face 81 of the first adjustment member 80 may have a hexagonal cross-sectional shape in which an associated outer peripheral face 45 of the second spring plate 44 engages in a positive-locking manner. The mentioned outer peripheral face 45 may also have a hexagonal cross-sectional shape. In a similar manner, an inner peripheral face 46 of the second spring plate 44 may have a hexagonal cross-sectional shape which engages in a positive-locking manner in an associated outer peripheral face 48 of the spacer screw 47. The cross-sectional shape of the last-mentioned outer peripheral face 48 may also be constructed in a hexagonal manner.

Reference should also be made to the various sealing rings 35.

Figure 2:
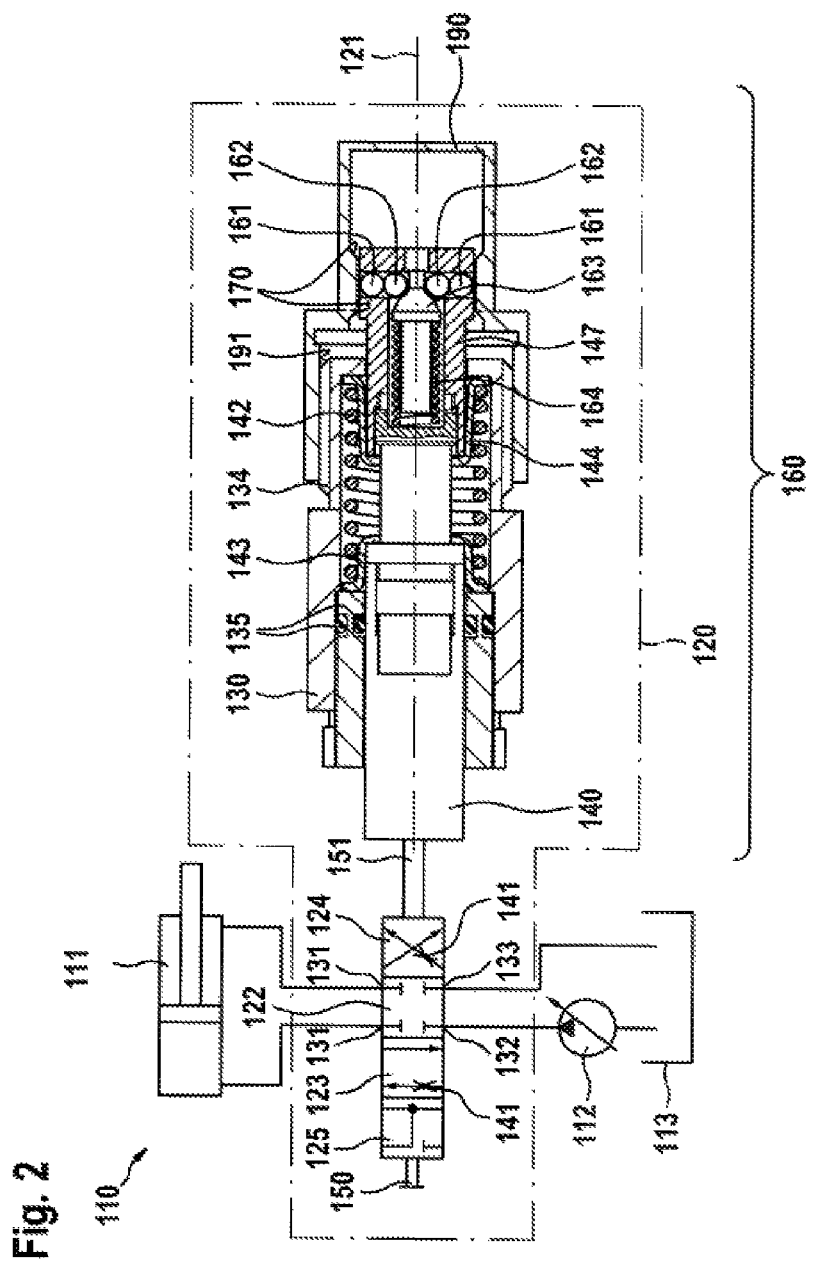
FIG. 2 shows a hydraulic drive system having a valve according to a second embodiment of the disclosure.

FIG. 2 shows a hydraulic drive system 110 having a valve 120 according to a second embodiment of the disclosure. The second embodiment is constructed in an identical manner to the first embodiment according to FIG. 1 with the exception of the differences described below so that reference may be made to the explanations relating to FIG. 1 in this regard. In this instance, in FIG. 2, those components which are present in FIG. 1 in an identical or corresponding manner are indicated with the same reference numeral increased by 100.

In the second embodiment of the valve 120, the spherical locking member 161 and the first spring 164 are arranged inside the sliding control member 140, wherein the catch contours 170 are arranged on the housing 130. The locking member 161 can be moved transversely relative to the longitudinal axis 121, wherein the force of the first spring 164 acts in the direction of the longitudinal axis 121. The corresponding force redirection is brought about by means of the cone 163 which is supported on the first spring 164, wherein the corresponding face which is circular-cone-like with respect to the longitudinal axis 121 abuts an auxiliary ball 162 which in turn is in abutment with the locking member 161. It is thereby ensured that the locking member 161 is retained in a reliable manner in each position by the associated hole in the sliding control member 140 in the direction of the longitudinal axis 121.

The second spring 142 operates in a similar manner to the first embodiment, wherein the second spring plate 144 is also supported on the housing 130 in the longitudinal direction 121. The housing 130 is constructed in several parts so that the second spring 142 and the two spring plates 143; 144 can be mounted. The locking member 161 and the auxiliary ball 162 are further received in the spacer screw 147. The spacer screw 147 extends for this reason in the direction of the longitudinal axis 121 beyond the second spring 142.

The two catch contours 170 are arranged on a separate second adjustment member 190 which inter alia surrounds the locking member 161 and the spacer screw 147 in a pot-like manner. The second adjustment member 190 is provided with a thread 191 which is constructed in this instance as an inner thread. The thread 191 is screwed onto a counter-thread 134 on the housing 130 which is constructed in this instance as an outer thread. By the second adjustment member 190 being rotated, the two catch contours 170 can be steplessly displaced in the direction of the longitudinal axis 121 relative to the housing 130. The position of the second adjustment member 190 may if desired be secured with a counter-nut (not illustrated).

The two catch contours 170 are each constructed as faces which are circular-cone-like with respect to the longitudinal axis 121. When the locking member 170 engages in the left-hand catch contour 170 in FIG. 2, the sliding control member 140 is located in the second operating position 124. When the locking member 170 engages in the right-hand catch contour 170 in FIG. 2, the sliding control member 140 is located in the first operating position 123. A rotation of the second adjustment member 190 then brings about a displacement of the sliding control member 140 in the direction of the longitudinal axis 121 so that the free cross-sectional surface-area of the diaphragm 141 constantly changes.

Figure 3:
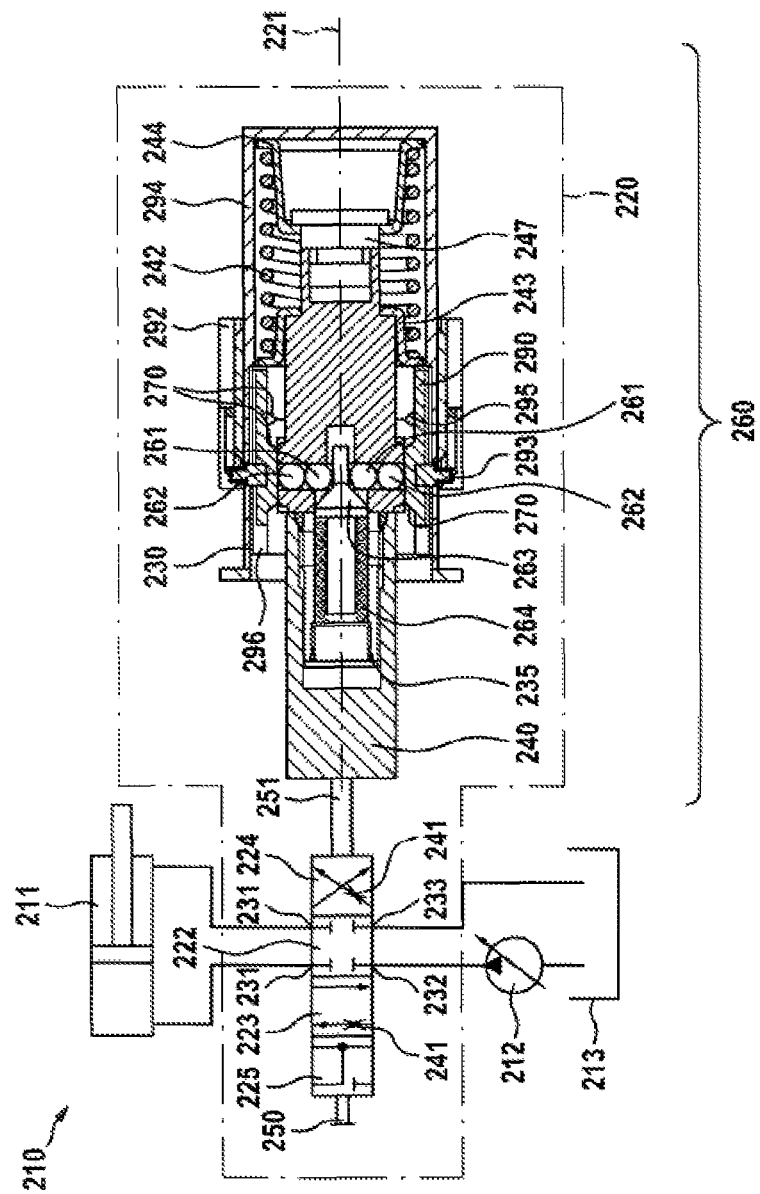
FIG. 3 shows a hydraulic drive system having a valve according to a third embodiment of the disclosure.

FIG. 3 shows a hydraulic drive system 210 having a valve 220 according to a third embodiment of the disclosure. The third embodiment, with the exception of the differences described below, is constructed in an identical manner to the second embodiment according to FIG. 2 or the first embodiment according to FIG. 1 so that reference may be made to the explanations relating to FIG. 2 and FIG. 1 in this regard. In this instance, in FIG. 3, those components which are present in FIG. 2 in an identical or corresponding manner are indicated with the same reference numeral increased by 100, wherein the reference numerals with respect to FIG. 1 are accordingly increased by 200.

Preferably, four locking members 261 are arranged so as to be offset through 90° with respect to the longitudinal axis 221. Two opposing locking members 261 are associated with the second adjustment member 290, wherein the other two locking members 261 are associated with the catch extension 295. The former ones are used for engagement in the operating positions 223 and 224, the latter ones for engagement in the free-running position 225.

The locking member 261 and the second spring are, as in the second embodiment, arranged in the sliding control member 240. The primary difference is the relative position between the second spring 242 and the closure member 261. The second spring 242 is now arranged at the outermost end of the sliding control member 240, whereas the closure member is arranged so as to be offset with respect to the second spring 242 relative to the center of the sliding control member 240. In the second embodiment, the relationships are precisely reversed. The second spring 242 is covered by means of a pot-like protective cap 294 which forms a non-movable portion of the multi-component housing 230. The separate second adjustment member 290 is received so as to be protected inside the protective cap 294, wherein it is movable in the direction of the longitudinal axis 221 with respect to the housing 230 or the protective cap 294. The two catch contours 270 on the second adjustment member 290 are constructed in an identical manner to the second embodiment.

The second adjustment member 290 is guided in a groove of the guiding sleeve 296. This also constitutes the catch extension 295 for the engagement of the free-running position 225.

The second adjustment member 290 is securely connected to a pin-like carrier 293, which protrudes from the protective cap 294 through an elongate hole. As a result of the carrier 293, the second adjustment member 290 is prevented inter alia from rotating with respect to the housing 230 or the protective cap 294. Furthermore, the carrier 293 is in carrying engagement in the direction of the longitudinal axis 221 with a union nut 292 which is screwed onto the protective cap 294 at the outer side. The carrier member 293 engages to this end in a groove which extends in an annular manner about the longitudinal axis 221 on an inner peripheral face of the union nut 292. A rotation of the union nut 293 brings about the displacement thereof in the direction of the longitudinal axis 221. This displacement is transmitted via the carrier 293 to the second adjustment member 290 so that the catch contours 270 at that location are displaced in the direction of the longitudinal axis 221.

Reference should also be made to the catch extension 295. This is preferably constructed on a separate guiding sleeve 296, which is securely connected to the protective cap 294 so that the catch extension 295 cannot be moved in the direction of the longitudinal axis 221. The catch extension 295 also forms a catch contour 270 with which the locking member 261 can be engaged, wherein the corresponding catch position corresponds to the free-running position 225. The catch extension 295 consequently has the same function as the second catch contour in the first embodiment.

LIST OF REFERENCE NUMERALS

10; 110; 210 Drive system
11; 111; 211 Actuator
12; 112; 212 Pump
13; 113; 213 Tank
20; 120; 220 Valve
21; 121; 221 Longitudinal axis
22; 122; 222 Locking position
23; 123; 223 First operating position
24; 124; 224 Second operating position
25; 125; 225 Free-running position
30; 130; 230 Housing
31; 131; 231 Operating connection location
32; 132; 232 Pump connection location
33; 133; 233 Tank connection location
134 Counter-thread
35; 135; 235 Sealing ring
40; 140; 240 Sliding control member
41; 141; 241 Diaphragm
42; 142; 242 Second spring
43; 143; 243 First spring plate
44; 144; 244 Second spring plate
45 Outer peripheral face of the second spring plate (hexagonal)
46 Inner peripheral face of the second spring plate (hexagonal)
47; 147; 247 Spacer screw (securely screwed into the sliding control member)
48 Outer peripheral face of the spacer screw (hexagonal)
50; 150; 250 Valve actuation
51; 151; 251 Connection (between sliding member portion which is shown schematically and in detail)
52 Outer peripheral face of the sliding control member
60; 160; 260 Locking device
61; 161; 261 Locking member
162; 262 Auxiliary ball
163; 263 Cone
64; 164; 264 First spring
65 Tappet
66 Abutment member
67 Closure screw
70; 170; 270 Catch contour
71 First catch contour
72 Second catch contour
80 First adjustment member
81 Inner peripheral face of the first adjustment member (hexagonal)
82 Retention member (for rotationally adjustable retention of the first adjustment member)
190; 290 Second adjustment member
191 Thread
292 Union nut
293 Carrier
294 Protective cap
295 Catch extension
296 Guiding sleeve

What is claimed is:

1. A hydraulic valve, comprising:
a sliding control member that is configured to be moved in the direction of a longitudinal axis and that delimits at least one constantly adjustable diaphragm;
a locking device having a locking member configured to be moved counter to the force of a first spring transversely relative to the longitudinal axis, the locking member and the first spring being received in the sliding control member; and
at least one catch contour in which the locking member is configured to be engaged in such a positive-locking manner that the sliding control member is releasably retained in a catch position that is associated with the respective catch contour,
wherein a position of at least one catch contour is constantly adjustable in such a manner that a free cross-sectional surface-area of the at least one diaphragm is constantly adjustable in the associated catch position, and
wherein at least one catch contour is arranged on a separate second adjustment member that is secured to a housing of the hydraulic valve so as to be adjustable in a linear manner with respect to the longitudinal axis.

2. The hydraulic valve according to claim 1, wherein the at least one catch contour is configured in a rotationally symmetrical manner with respect to the longitudinal axis.

3. The hydraulic valve according to claim 1, wherein:
the second adjustment member has a thread with a center axis that coincides with the longitudinal axis, and
the thread is in screwed engagement with a counter-thread on the housing.

4. The hydraulic valve according to claim 1, further comprising a separate union nut that is in screwed engagement with the housing such that the union nut is configured to be moved in the direction of the longitudinal axis, the union nut coupled to the second adjustment member in terms of movement in the direction of the longitudinal axis.

5. A hydraulic valve, comprising:
a sliding control member that is configured to be moved in the direction of a longitudinal axis and that delimits at least one constantly adjustable diaphragm;
a locking device having a locking member configured to be moved counter to the force of a first spring transversely relative to the longitudinal axis, the force of the first spring acting in the direction of the longitudinal axis; and
at least one catch contour in which the locking member is configured to be engaged in such a positive-locking manner that the sliding control member is releasably retained in a catch position that is associated with the respective catch contour,
wherein a position of at least one catch contour is constantly adjustable in such a manner that a free cross-sectional surface-area of the at least one diaphragm is constantly adjustable in the associated catch position,
wherein the locking member and the first spring are arranged inside the sliding control member, and
wherein at least one catch contour is arranged on a separate second adjustment member that is secured to a housing of the hydraulic valve so as to be adjustable in a linear manner with respect to the longitudinal axis.

6. The hydraulic valve according to claim 5, wherein the at least one catch contour is configured in a rotationally symmetrical manner with respect to the longitudinal axis.

7. The hydraulic valve according to claim 5, wherein:
the second adjustment member has a thread with a center axis that coincides with the longitudinal axis, and
the thread is in screwed engagement with a counter-thread on the housing.

8. The hydraulic valve according to claim 5, further comprising a separate union nut that is in screwed engagement with the housing such that the union nut is configured to be moved in the direction of the longitudinal axis, the union nut coupled to the second adjustment member in terms of movement in the direction of the longitudinal axis.

* * * * *